United States Patent
Duggan et al.

(10) Patent No.: US 11,334,303 B1
(45) Date of Patent: May 17, 2022

(54) METHODS AND SYSTEMS FOR ORGANIZING VARIABLE DATA DOCUMENTS INCLUDING THOSE WITH LONG REPEAT LENGTHS

(71) Applicant: Global Graphics Software Limited, Cambridge (GB)

(72) Inventors: Angus Duggan, Seattle, WA (US); Martin Bailey, Cambridgeshire (GB)

(73) Assignee: GLOBAL GRAPHICS SOFTWARE LIMITED, Cambridge (GB)

( * ) Notice: Subject to any disclaimer, the term of this patent is extended or adjusted under 35 U.S.C. 154(b) by 0 days.

(21) Appl. No.: 17/199,147

(22) Filed: Mar. 11, 2021

(51) Int. Cl.
  *G06F 3/12* (2006.01)
(52) U.S. Cl.
  CPC .......... *G06F 3/126* (2013.01); *G06F 3/1205* (2013.01); *G06F 3/1224* (2013.01)
(58) Field of Classification Search
  None
  See application file for complete search history.

(56) References Cited

U.S. PATENT DOCUMENTS

| | | | |
|---|---|---|---|
| 2012/0188590 A1* | 7/2012 | Klassen | G06F 3/1247 358/1.15 |
| 2013/0258374 A1* | 10/2013 | Klassen | G06F 3/124 358/1.13 |
| 2013/0258375 A1* | 10/2013 | Morgana | G06K 15/1822 358/1.13 |
| 2014/0333947 A1* | 11/2014 | Robinson | G06F 3/1248 358/1.13 |
| 2016/0321017 A1* | 11/2016 | Matsubara | G06F 3/1212 |
| 2021/0004182 A1* | 1/2021 | Drogo | G06F 3/1244 |

* cited by examiner

*Primary Examiner* — Henok Shiferaw
(74) *Attorney, Agent, or Firm* — Branch Partners PLLC; Bruce E. Black

(57) ABSTRACT

A method for printing a variable data document includes receiving the variable data document which has a specified or estimated repeat length L; receiving or selecting a designated queue size (DQS) and a parameter Q representing a number of repeated pages to be provided in a chunk; arranging at least a portion of the variable data document into at least one cycle of chunks for processing using raster image processors (RIPs), wherein each of the at least one cycle of chunks contains R chunks and each chunk of a first cycle of the at least one cycle of chunks has a size C determined using DQS, Q, and L; and processing, using the RIPs, the portion of the variable data document into rasters for printing by providing at least one chunk of the at least one cycle of chunks to each of the RIPs.

20 Claims, 2 Drawing Sheets

METHODS AND SYSTEMS FOR ORGANIZING VARIABLE DATA DOCUMENTS INCLUDING THOSE WITH LONG REPEAT LENGTHS

FIELD

The present invention is directed to the area of document processing and printing. The present invention is also directed to methods and systems for processing and printing variable data documents including those with relatively long repeat lengths.

BACKGROUND

The use of variable data in print jobs is growing rapidly across multiple sectors of the print industry, from transactional (credit card statements, phone bills, and the like) through direct mail, promotional items, signage, labels, packaging, and so on.

Variable data printing is used to produce series of printed products where each one of that series differs slightly from the others, for example, printing different names and addresses on an envelope or postcard. Variable data printing may also include more complex differences using some graphics that are the same on every page, some that are unique to a single instance (for example, for one recipient of a mail piece) and some that are selected from small sets, perhaps based on metadata about that recipient.

One example is a postcard mailed out by a car dealership to encourage past customers to upgrade to the latest model of a car that the customer bought several years ago. For example, the postcard can have a static background with encouraging text, a company logo, an image aligned with the brand philosophy, and a map showing where the dealership is. The postcard can also include single use data such as the name and address of the customer, and optionally additional information such as exactly when the customer bought the last car. The postcard can also include data that is common to a subset of the customers such as an image of this years' model of the car that the customer previously purchased, possibly even in a similar color to the customer's current car. There may also be a photograph, signature, or name of the salesman from whom the customer bought the previous car. Such images or data are selected from a small set of images for each usage, which may be, for example, only two or three for the salesman's image or signature, and may be a dozen or so for the car image.

Variable data printing often utilizes digital printing presses for at least some parts of each variable data document, because it may be more difficult to use conventional presses (offset lithographic, flexographic, gravure, or the like) to print one page slightly different from the previous copy of that page. Digital printing presses include, but are not limited to, electrophotographic and inkjet presses, as well as presses that use related technologies.

Early on in the adoption of variable data printing it was common for static data to be printed conventionally and then for the variable portions to be overprinted on those 'shells' using a digital press. That is still a common solution for many situations, such as adding competition entry data onto a newspaper, or a batch number onto packaging. But the use of "white paper workflows" where the entire design, including static, re-used, and single-use data is printed using a single printing pass, has been growing rapidly, enabling much richer and more complex variability.

At the same time, the speed and printing quality of digital presses has been rising, with that quality often coming from increased resolution and, in some cases, from an increase in the number of different colorants printed onto the paper. These changes have increased the amount of data that the press requires to print each item, and increased the load on the processing used to produce that data making it harder to keep up with the press.

As an example, some digital presses print the equivalent of approximately 13,500 letter sized pages per minute, consuming around 47 GB of (uncompressed, unscreened) raster data per second to do so. For example, the digital press can be a roll-fed press in which the combined weight of the roll of paper being fed in and the roll being fed out amounts to several tons, making it difficult to stop the press if the RIPing (Raster Image Processing) cannot keep up with the printing process.

BRIEF SUMMARY

One embodiment is a method for printing a variable data document. The method includes receiving the variable data document, wherein the variable data document includes a plurality of sub-documents, wherein each of the sub-documents includes an identical portion that is identical for each sub-document and a variable data portion that differs from least one of the other sub-documents, wherein the variable data document has a specified or estimated repeat length L; receiving or selecting a designated queue size (DQS) and a parameter Q representing a number of repeated pages to be provided in a chunk; arranging at least a portion of the variable data document into at least one cycle of chunks for processing using a plurality of raster image processors (RIPs), wherein each of the at least one cycle of chunks contains R chunks $C_1, \ldots, C_R$, wherein R is an integer greater than one, wherein, for $i=1, \ldots, R$, each chunk $C_i$ of a first cycle of the at least one cycle of chunks has a size C defined as follows Q' is equal to one of a) floor(DQS/L), b) ceiling(DQS/L), c) round(DQS/L), or d) DQS/L, when $Q' \geq Q$, then C is equal to one of a) floor(Q'×L/R), b) ceiling(Q'×L/R), c) round(Q'×L/R), d) floor(DQS/R), e) ceiling(DQS/R), or f) round(DQS/R) and each of the chunks $C_i$ includes either a) pages i, i+R, ..., i+(C−1)R of the portion of the variable data document or b) pages i, i+L, ..., i+(C−1)L of the portion of the variable data document, wherein selection of a) or b) is identical for all of the chunks $C_i$, and when Q'<Q then C is equal to one of a) ceiling(L×Q/R), b) floor(L×Q/R), or c) round(L×Q/R) and each of the chunks $C_i$ includes pages i, i+R, ..., i+(C−1)R of the portion of the variable data document; and processing, using the RIPs, the portion of the variable data document into rasters for printing by providing at least one chunk of the at least one cycle of chunks to each of the RIPs.

In at least some embodiments, the method further includes printing the variable data document using the rasters. In at least some embodiments, R corresponds to the number of RIPs. In at least some embodiments, DQS is an estimate of a number of pages that can be buffered in short-term memory. In at least some embodiments, Q is in a range from 3 to 60.

In at least some embodiments, the at least one cycle of chunks includes a plurality of cycles of chunks. In at least some embodiments, the plurality of cycles of chunks includes J cycles of chunks, wherein J is an integer and is at least 3 and j=1, ..., J, wherein, for each cycle j except for j=J, each chunk $C_{ij}$ of a jth cycle of chunks has a size C defined as follows Q' is equal to one of a) floor(DQS/L), b) ceiling(DQS/L), or c) round(DQS/L), when Q'≥Q, then C is equal to one of a) floor(Q'×L/R), b) ceiling(Q'×L/R), c) round(Q'×L/R), or d) DQS/R and each of the chunks $C_{ij}$ includes either a) pages i+(j−1)CR, i+R+(j−1)CR, ..., i+(C−1)R+(j−1)CR of the portion of the variable data document or b) pages i+(j−1)CL, i+L+(j−1)CL, ..., i+(C−1)L+(j−1)CL of the portion of the variable data document, wherein selection of a) or b) is identical for all of the chunks $C_{ij}$, and when Q'<Q then C is equal to one of a) ceiling(L×Q/R), b) floor(L×Q/R), or c) round(L×Q/R) and each of the chunks $C_{ij}$ includes pages i+(j−1)CR, i+R+(j−1)CR, ..., i+(C−1)R+(j−1)CR of the portion of the variable data document.

Another embodiment is a system for printing a variable data document that includes at least one processor configured and arranged to perform actions, the actions including: receiving the variable data document, wherein the variable data document includes a plurality of sub-documents, wherein each of the sub-documents includes an identical portion that is identical for each sub-document and a variable data portion that differs from least one of the other sub-documents, wherein the variable data document has a specified or estimated repeat length L; receiving or selecting a designated queue size (DQS) and a parameter Q representing a number of repeated pages to be provided in a chunk; arranging at least a portion of the variable data document into at least one cycle of chunks for processing using a plurality of raster image processors (RIPs), wherein each of the at least one cycle of chunks contains R chunks $C_1, ..., C_R$, wherein R is an integer greater than one, wherein, for i=1, ..., R, each chunk $C_i$ of a first cycle of the at least one cycle of chunks has a size C defined as follows Q' is equal to one of a) floor(DQS/L), b) ceiling(DQS/L), c) round(DQS/L), or d) DQS/L, when Q'≥Q, then C is equal to one of a) floor(Q'×L/R), b) ceiling(Q'×L/R), c) round(Q'×L/R), d) floor(DQS/R), e) ceiling(DQS/R), or f) round(DQS/R) and each of the chunks $C_i$ includes either a) pages i, i+R, ..., i+(C−1)R of the portion of the variable data document or b) pages i, i+L, ..., i+(C−1)L of the portion of the variable data document, wherein selection of a) or b) is identical for all of the chunks $C_i$, and when Q'<Q then C is equal to one of a) ceiling(L×Q/R), b) floor(L×Q/R), or c) round(L×Q/R) and each of the chunks $C_i$ includes pages i, i+R, ..., i+(C−1)R of the portion of the variable data document; and processing, using the RIPs, the portion of the variable data document into rasters for printing by providing at least one chunk of the at least one cycle of chunks to each of the RIPs.

In at least some embodiments, the system further includes a printing device coupled to the at least one processor and the actions further include printing, on the printing device, the variable data document using the rasters. In at least some embodiments, R corresponds to the number of RIPs. In at least some embodiments, DQS is an estimate of a number of pages that can be buffered in short-term memory. In at least some embodiments, Q is in a range from 3 to 60.

In at least some embodiments, the at least one cycle of chunks includes a plurality of cycles of chunks. In at least some embodiments, the plurality of cycles of chunks includes J cycles of chunks, wherein J is an integer and is at least 3 and j=1, ..., J, wherein, for each cycle j except for j=J, each chunk $C_{ij}$ of a jth cycle of chunks has a size C defined as follows Q' is equal to one of a) floor(DQS/L), b) ceiling(DQS/L), or c) round(DQS/L), when Q'≥Q, then C is equal to one of a) floor(Q'×L/R), b) ceiling(Q'×L/R), c) round(Q'×L/R), or d) DQS/R and each of the chunks $C_{ij}$ includes either a) pages i+(j−1)CR, i+R+(j−1)CR, ..., i+(C−1)R+(j−1)CR of the portion of the variable data document or b) pages i+(j−1)CL, i+L+(j−1)CL, ..., i+(C−1)L+(j−1)CL of the portion of the variable data document, wherein selection of a) or b) is identical for all of the chunks $C_{ij}$, and when Q'<Q then C is equal to one of a) ceiling(L×Q/R), b) floor(L×Q/R), or c) round(L×Q/R) and each of the chunks $C_{ij}$ includes pages i+(j−1)CR, i+R+(j−1)CR, ..., i+(C−1)R+(j−1)CR of the portion of the variable data document.

A further embodiment is a non-transitory computer-readable medium having processor-executable instructions for printing a variable data document, the processor-executable instructions when installed onto a device enable the device to perform actions, the actions including: receiving the variable data document, wherein the variable data document includes a plurality of sub-documents, wherein each of the sub-documents includes an identical portion that is identical for each sub-document and a variable data portion that differs from least one of the other sub-documents, wherein the variable data document has a specified or estimated repeat length L, and; receiving or selecting a designated queue size (DQS) and a parameter Q representing a number of repeated pages to be provided in a chunk; arranging at least a portion of the variable data document into at least one cycle of chunks for processing using a plurality of raster image processors (RIPs), wherein each of the at least one cycle of chunks contains R chunks $C_1, ..., C_R$, wherein R is an integer greater than one, wherein, for i=1, ..., R, each chunk $C_i$ of a first cycle of the at least one cycle of chunks has a size C defined as follows Q' is equal to one of a) floor(DQS/L), b) ceiling(DQS/L), c) round(DQS/L), or d) DQS/L, when Q'≥Q, then C is equal to one of a) floor(Q'×L/R), b) ceiling(Q'×L/R), c) round(Q'×L/R), d) floor(DQS/R), e) ceiling(DQS/R), or f) round(DQS/R) and each of the chunks $C_i$ includes either a) pages i, i+R, ..., i+(C−1)R of the portion of the variable data document or b) pages i, i+L, ..., i+(C−1)L of the portion of the variable data document, wherein selection of a) or b) is identical for all of the chunks $C_i$, and when Q'<Q then C is equal to one of a) ceiling(L×Q/R), b) floor(L×Q/R), or c) round(L×Q/R) and each of the chunks $C_i$ includes pages i, i+R, ..., i+(C−1)R of the portion of the variable data document; and processing, using the RIPs, the portion of the variable data document into rasters for printing by providing at least one chunk of the at least one cycle of chunks to each of the RIPs.

In at least some embodiments, the actions further include printing the variable data document using the rasters. In at least some embodiments, DQS is an estimate of a number of pages that can be buffered in short-term memory. In at least some embodiments, Q is in a range from 3 to 60.

In at least some embodiments, the at least one cycle of chunks includes a plurality of cycles of chunks. In at least some embodiments, the plurality of cycles of chunks includes J cycles of chunks, wherein J is an integer and is at least 3 and j=1, ..., J, wherein, for each cycle j except for j=J, each chunk $C_{ij}$ of a jth cycle of chunks has a size C defined as follows Q' is equal to one of a) floor(DQS/L), b) ceiling(DQS/L), or c) round(DQS/L), when Q'≥Q, then C is equal to one of a) floor(Q'×L/R), b) ceiling(Q'×L/R), c) round(Q'×L/R), or d) DQS/R and each of the chunks $C_{ij}$ includes either a) pages i+(j−1)CR, i+R+(j−1)CR, ..., i+(C−1)R+(j−1)CR of the portion of the variable data document or b) pages i+(j−1)CL, i+L+(j−1)CL, ..., i+(C−1)L+(j−1)CL of the portion of the variable data document, wherein selection of a) or b) is identical for all of the chunks $C_{ij}$, and when Q'<Q then C is equal to one of a) ceiling(L×Q/R), b) floor(L×Q/R), or c) round(L×Q/R) and each of the chunks $C_{ij}$ includes pages i+(j−1)CR, i+R+(j−1)CR, ..., i+(C−1)R+(j−1)CR of the portion of the variable data document.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention is directed to the area of document processing and printing. The present invention is also directed to methods and systems for processing and printing variable data documents including those with relatively long repeat lengths.

The methods, systems, and devices described herein may be embodied in many different forms and should not be construed as limited to the embodiments set forth herein. Accordingly, the methods, systems, and devices described herein may take the form of an entirely hardware embodiment, an entirely software embodiment or an embodiment combining software and hardware aspects. The following detailed description is, therefore, not to be taken in a limiting sense. The methods described herein can be performed using any type of processor and any suitable type of device that includes a processor.

Figure 1:
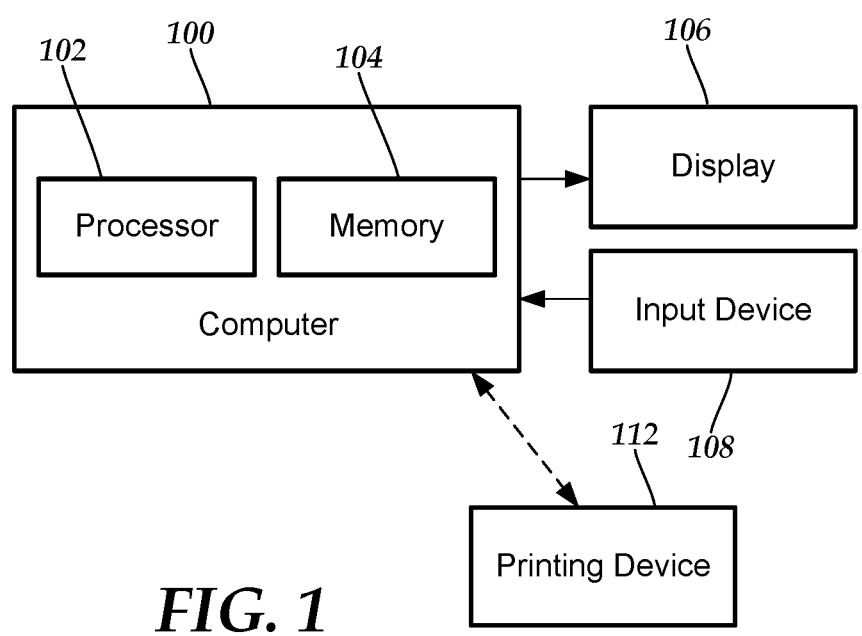
FIG. 1 is a schematic block diagram of one embodiment of a system for processing documents for printing, according to the invention.

FIG. 1 illustrates one embodiment of a system for practicing the invention. The system can include a computer 100 or any other device that includes a processor 102 and a memory 104, a display 106, an input device 108, and a printing device 112, such as a printer or press. The printing device 112 can be a digital press (for example, electrophotographic or inkjet presses), a conventional press (for example, (offset lithographic, flexographic, or gravure presses), an inkjet device, a laser printing device, or any other suitable printing device. Unless otherwise indicated, the terms "printing device" and "press" are used interchangeably herein. In some embodiments, one or more of the computer 100, display 106, or input device 108 can be part of the printing device 112.

The computer 100 can be a laptop computer, desktop computer, server computer, tablet, mobile device, smartphone, or other devices that can run applications or programs, or any other suitable device for processing information and for presenting a user interface. Alternatively or additionally, the computer 100 can be part of the printing device 112 or coupled (by wired or wireless coupling) to the printing device. The computer 100 can be local to the user or can include components that are non-local to the user including one or both of the processor 102 or memory 104 (or portions thereof). For example, in some embodiments, the user may operate a terminal that is connected to a non-local computer. In other embodiments, the memory can be non-local to the user.

The computer 100 can utilize any suitable processor 102 including one or more hardware processors that may be local to the user or non-local to the user or other components of the computer. The processor 102 is configured to execute instructions provided to the processor, as described below.

Any suitable memory 104 can be used for the computer 100. The memory 104 illustrates a type of computer-readable media, namely computer-readable storage media. Computer-readable storage media may include, but is not limited to, nonvolatile, non-transitory, removable, and non-removable media implemented in any method or technology for storage of information, such as computer readable instructions, data structures, program modules, or other data. Examples of computer-readable storage media include RAM, ROM, EEPROM, flash memory, or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by a computer.

Communication methods provide another type of computer readable media; namely communication media. Communication media typically embodies computer-readable instructions, data structures, program modules, or other data in a modulated data signal such as a carrier wave, data signal, or other transport mechanism and include any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

The display 106 can be any suitable display device, such as a monitor, screen, display, or the like. The input device 108 can be, for example, a keyboard, mouse, touch screen, track ball, joystick, voice recognition system, or any combination thereof, or the like and can be used by the user to interact with a user interface.

Some of the last processes before delivering data to the printing device to print are those which are often performed within the Digital Front End (DFE) for the printing device. These processes may include one or more of the following: interpretation of the print stream (for example, data in a PDF or PostScript format), color management, rendering to a raster format, or application of halftone screening. These processes transform the supplied data from a format designed for interchange between devices into raster data that can be delivered to the press marking engine (for example, a drum or inkjet heads). These processes, or a subset thereof, are referred to herein as "RIPing" ("Raster Image Processing"), even though they are not always all performed by the same processor or using a single software product.

For a non-variable print job, the RIPing can be performed once, and then the same halftoned raster data can be sent to the marking engine as many times as required to print the number of copies specified. However, when printing variable data documents at least some portion of the elements on at least some subset of pages is different from other copies of that corresponding page in the printed documents. In at least some instances, the pages with variable data are processed individually. In at least some instances, every page is RIPed just once. The RIPing process, however, should be performed fast enough to keep the printing device running.

Unless indicated otherwise, the term "page" as used herein refers to any division or section of document that is used to divide or measure a length or size of the document. Unless indicated otherwise, the term "page" is not limited to a single printed sheet or side of a sheet.

A variety of different interactions are used between the RIPing of rasters and the delivery to the marking engine for variable data documents. These include RIPing to disk or other long-term storage (for example, saving all of the rasters as disk files, and then reading those back to be delivered to the printing device), and RIPing directly or in-real-time (where a small set of the rasters is held in short-term storage (for example, in RAM or other memory) before being passed on to the marking engine). The latter model uses some amount of buffer space in the memory or other short-term storage to hold the raster data and operates best when the RIPing can produce, at least on average, the rasters as fast as the marking engine can consume the rasters.

Many systems have been built to facilitate the RIPing process for variable data documents in order to reduce the load on the DFE (and therefore often the bill of materials for building it) or other elements of the printing device or printing system. In at least some embodiments, graphics or combinations of graphics are identified that are used multiple times on the pages and rendered only once. These graphics are then recomposited with graphics that are only used once later in the process.

At the same time, the DFE for most presses with maximum recommended monthly volumes over one million impressions run multiple RIPs (Raster Image Processors) in parallel to achieve a faster RIPing speed. A variable data document for such a press often contains at least one thousand pages, and potentially up to several million. Those pages are preferably delivered to the press in the correct order. For submission to the RIPs, the pages are often divided into page ranges which can be described as 'chunks'. In at least some embodiments, whenever a RIP is free, because it has finished the last chunk of a variable data document that the RIP was sent, the RIP is given the next available chunk. This responsive approach improves load balancing so that any pages that happen to be more complex (and therefore RIP more slowly) than the rest do not hinder delivery of pages in order to the press.

In at least some embodiments, keeping the chunk size fairly small allows the load balancing to be as efficient as possible, which in turn limits the RAM or other short-term storage used to store raster data between the RIPs and delivery to the marking engine, because the order of raster delivery from the RIPs will be closer to the order in which they should be sent to the marking engine.

If the available RAM or other short-term storage for storing rasters runs low, but one or more pages that are to be printed before those already in the RAM or other short-term storage are not yet available, then the DFE may halt one or more RIPs to ensure that it is not deadlocked. The RIP that will deliver the rasters to be printed next should have the space in the short-term storage to deliver those rasters into. In an extreme case it may even be necessary to delete rasters from the short-term storage and then to produce them again later.

To facilitate RIPing, a method or system can identify which graphical elements are used more than once within a single chunk. This can be particularly beneficial when a single chunk includes multiple instances of the same reused graphical elements. The term "sub-document", as used herein, is the contiguous sequence of pages within the submitted file that form one copy of the page design, where the sub-document is repeated for multiple copies of the page design with variable data in at least two of the copies. For example, a sub-document can be the pages that are intended for one recipient of the printed piece or that form the pages of a single copy of a variable book.

Some variable data documents contain only one, two or a handful of pages per sub-document, so a moderate chunk size, for example, 56 PDF pages, can be an efficient chunk for RIPing.

But some variable data documents have more pages per sub-document, sometimes described as having longer repeat lengths or longer strides. One example is a personalized booklet, perhaps a college prospectus or financial report, containing 32 pages. In this example, each 56-page chunk includes repeats of just over half of the pages in each sub-document and the printing system or printing device is likely to be less efficient at identifying re-use for graphical elements that are not used on multiple pages.

One response would be to increase the chunk size. Making each chunk 64 pages instead of 50 is a fairly small step. Now there are two copies of each sub-document page in each chunk. If the variable data document is a simple mix of static and single-use graphics this is likely to identify those re-used elements at the cost of a relatively small increase in the RAM requirement for buffering rasters between the RIPs and the marking engine.

But if some of the graphics are selected from small sets, perhaps based on metadata held about that recipient, then it's very likely that the RIP will still only see one copy of each within a single chunk. Where reuse is identified it is likely not to support the increased efficient processing of reused data which would entail collections of reused graphics that are reused together being coalesced into composite units which, in turn, tends to entail a larger number of instances to be identified.

Increasing the chunk size high enough to increase the likelihood of identifying re-use within a single chunk may compromise the load balancing across multiple RIPs sufficiently so that RIPs may be halted or rasters may be deleted and regenerated in order to guarantee delivery of rasters to the marking engine in the correct order.

As the repeat length of variable data documents increases still further it may no longer be viable to identify re-use by submitting chunks in this way to each RIP and to expect RIPs to identify re-use within a single chunk.

To address this challenge, as described herein, the composition and the size of each chunk can be adjusted in response to the hardware available (especially RAM for storage), the repeat length of the variable data document, the number of RIPs, and, optionally, the complexity of the variable data composition.

A variable data document includes a series of sub-documents. As an example, the variable data document may be a direct mail document with each sub-document intended for one recipient for direct mail delivery. The repeat length of the variable data document is the length of each of those sub-documents. In at least some embodiments, the repeat length is identified early in the process. In at least some embodiments, this may be done by the composition engine that created the variable data print document. As an example, a PDF/VT file, or an optimized PDF file conforming to PDF 2.0 (ISO 32000-2) can contain a Document Part structure, often abbreviated to DPart, which can identify the page ranges for each sub-document within the file. Alternatively, the repeat length or information for determining the repeat length can be communicated inside or outside of the file of the variable data document.

In at least some embodiments, if the composition engine or other source of the variable data document does not provide the repeat length, the repeat length may be determined by a review of structures within the PDF file. Re-used graphics are often encoded into PDF files using structures known as XObjects. A review of which pages reference each XObject may be used to identify the repeat length in many variable data documents.

Once the repeat length is known, the DFE calculates a chunk size and composition. The following abbreviations are used:

C=chunk size;
L=repeat length (i.e. the length of one sub-document; this description assumes that all sub-documents are the same length for simplicity, although the systems and methods described herein can also be used for sub-documents of non-uniform length);
N=the chunk number in the sequence of chunks to be RIPed;
P=the page number within one sub-document;
R=the number of RIPs in the DFE over which the variable data document is to be split; and
Q=a parameter corresponding to the number of sub-documents from which a page should be included in each chunk to provide confidence that reuse will be identified. In at least some embodiments, this parameter is defined in, or selected by, the printing system or printing device. In at least some embodiments, this parameter may be user-selectable or user-definable.

In addition, the term "a cycle of chunks" or "cycle" is used to mean a collection of R contiguous chunks from the sequence of chunks. Thus, if nothing else is being processed in a DFE it is highly likely that the first cycle of chunks will all be delivered to the available RIPs at more or less the same time during the RIPing of the variable data document. If all pages (or the sum of all pages in each chunk) are of equal complexity, then it is likely that each chunk will take approximately the same amount of time to RIP, and therefore the second cycle of chunks (for example, chunks 6, 7, 8, 9 and 10 if R=5) will be started at around the same time as each other. In at least some embodiments, there is no assumption that chunk 6 will be given to the same RIP as chunk 1, or that chunk 7 will be given to the same RIP as chunk 2; each chunk in sequence will be given to the first RIP to complete its previous chunk. This ensures that a page or chunk that takes significantly more time than other pages or chunks does not cause RIPing to stall.

A designated queue size (DQS) can be defined or selected. The DQS may be selected using considerations such as, for example, features of the DFE (including, for example, the amount of short-term storage available for storing rasters between the RIP and the marking engine) and factors affecting the size of each raster (press resolution, page/sheet size, number of colorants, or the like or any combination thereof). In at least some embodiments, the DQS is an estimate or a determination of the number of pages that can be buffered between the RIPs and any onward processing after the RIPs. As an example, the DQS is set to 280 pages.

If the DQS is 280 pages, then the size (in pages) of the buffer that can conceptually be filled from each RIP is DQS/R, or 56 if R=5. This is not intended to suggest that the buffer space is rigidly divided into sub-buffers of that size, only that balanced delivery from the multiple RIPs will allow that many pages per RIP to be held. The term DQS/R can be called the Designated Chunk Size (DCS). In at least some embodiments, the chunk size C is set equal to DCS.

The following are considerations for determining the number and arrangement of pages within each chunk submitted to the RIPs: 1) limiting the buffer size between the RIP(s) and onward delivery of rasters; 2) delivering the pages in the order (or near the order) for printing; and 3) increasing the likelihood of reused graphics being recognized in the chunks.

Of these considerations, the first two are normally aligned; (i.e., the delivery of rasters in near to printing order tends to reduce the buffer size that is needed.) But these two can conflict with the third consideration (identification of reuse) depending on, for example, RIP count, repeat length, DCS, or the like or any combination thereof.

Accordingly, one method to choose the composition of the chunk for the smallest buffer requirement and a delivery of rasters in order is to send every $R^{th}$ page to each RIP. Thus, if R=5, the first chunk would contain pages 1, 6, 11, 16, etc., the second pages 2, 7, 12, 17, etc., the third pages 3, 8, 13, 18, etc. and so forth. The next chunk would start with the first page not included in the first set of R chunks, for example, when R=5 and C=56, the first page of the first chunk in the second cycle of chunks would be 5×56+1, or 281. If every page takes the same amount of time to process through the RIP, the page rasters will then be delivered in very close to the correct order for printing.

One method for identifying reuse is based on the recognition that a graphical element is much more likely to be reused at the same size and rotation on the same page number within each sub-document than it is on other pages within each sub-document. Thus, for a 32-page repeat length, a graphical element on page 1 is most likely to be reused on pages 33, 65, 97, 129, etc. rather than on any other pages within those sub-documents.

So likely identification of reuse will be achieved for the majority of variable data documents by filling the first chunk with the first page of each sub-document. Using the example values above of C=56 and L=32, it would therefore include pages 1, L+1, 2×L+1, 3×L+1 ... (C−1)×L+1, or 1, 33, 65, 97 ... 1761. In general, a chunk P (up to chunk L) would contain pages P, L+P, 2×L+P, 3×L+P ... (C−1)×L+P.

After that the cycle would start again with P=1, but adding in the number of pages addressed by the first L chunks: C×L+P, (C+1)×L+P, (C+2)×L+P, (C+3)×L+P etc.

For a 32-page repeat length and 5 RIPs, the Rips would be on the 7th cycle of chunks by the time that all pages of the first sub-document are available to the press using this model. With C=56 that means that the RIPs would have delivered (floor(L/R)*R*C)+(mod(L/R)*R)=(6*5*56)+(2*5)=1690 pages; far greater than the suggested DQS of 280.

This approach would work well when RIPing to disk, by providing discovery of reused graphics and reducing rendering.

However, RIPing direct to the marking engine is commonly used for the fastest digital presses, if only because the short-term storage to handle a complete variable data document is likely to lead to an excessively high bill of materials. A desirable chunk composition for identifying reuse is often not desirable for the buffering requirements in a direct RIPing DFE because a very large number of later rasters will be delivered (and stored) before the raster for page R+1 is delivered.

In other words, the desirable chunk composition for minimizing buffer size contradicts the requirements for the desirable identification of reuse unless DCS is greater than several times L. In our example 56 is only 1.75 times 32, so reuse would likely not be recognized, or may be recognized in a way that does not support efficient further processing.

A fusion of the methods for the three considerations of limited buffer size, smooth raster order delivery, and recognition of reused graphics is presented herein.

Figure 2:
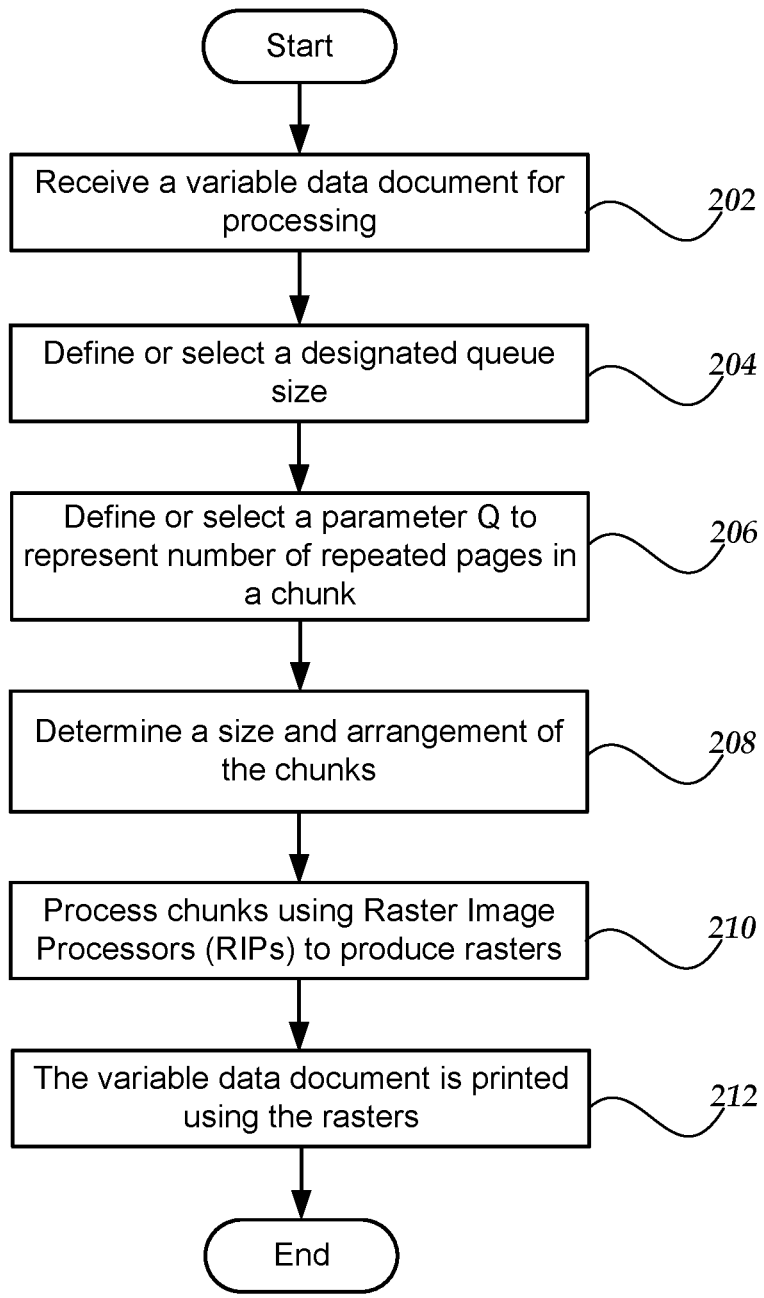
FIG. 2 is a schematic flowchart of one embodiment of a method of printing a variable data document, according to the invention.

FIG. 2 illustrates one embodiment of a method of printing a variable data document. In step 202, a variable data document is received by a printing system or a printing device, such as a digital press. In at least some embodiments, the variable data document includes an explicit indication of the repeat length L. In other embodiments, the printing system determines or estimates the repeat length L using any suitable method including, but not limited to, those methods described above.

In step 204, the designated queue size (DQS) is defined or selected. The DQS may be selected using considerations such as, for example, features of the DFE (including, for example, the amount of short-term storage available for storing rasters between the RIP and the marking engine) and factors affecting the size of each raster (press resolution, page/sheet size, number of colorants, or the like or any combination thereof). In at least some embodiments, the DQS is an estimate or a determination of the number of pages that can be buffered between the RIPs and any onward processing after the RIPs. As an example, the DQS is set to 280 pages.

If the DQS is 280 pages, then the size (in pages) of the buffer that can conceptually be filled from each RIP is DQS/R, or 56 if R=5. This is not intended to suggest that the buffer space is rigidly divided into sub-buffers of that size, only that balanced delivery from the multiple RIPs will allow that many pages per RIP to be held. The term DQS/R can be called the Designated Chunk Size (DCS).

In step 206, a parameter Q is defined or selected to represent the number of repeated pages (from corresponding sub-documents) to be provided in a chunk to yield high-quality identification of reuse. In at least some embodiments, each chunk is arranged to include instances of the same page from Q sub-documents in the variable data document file. This parameter Q facilitates providing an appropriate chunk composition for variable data printing on a DFE using multiple RIPs and RIPing direct to the marking engine.

In general, Q is an integer with a value of 3 or greater. For example, a variable data document with static backgrounds and single-use foregrounds Q may be as low as 3 to confidently identify reuse, including the combinations of several reused graphics commonly placed in the same relationships on the same page. In a variable data document with more complex variability, including data selected from a small set (such as the image of a car in one of these examples presented above) then Q may be larger than 3 to identify the combinations of reused graphics that are used together. In at least some embodiments, Q may be at least 2, 2.5, or 3 times the number of different images for a particular section of the sub-document. As an example, if an image of a car (in the example used above) is selected from a set of 12 different images (for example, different car models or different car colors), then Q could be 30 or more. In at least some embodiments, having Q in the range of 3 to 6 or a range of 3 to 10 or a range of 3 to 30 or a range of 3 to 60 to increase the efficiency of identification of reused graphics.

In step 208, the size and arrangement of the chunks is determined. In at least some embodiments, to facilitate smooth delivery of page rasters, in print order or near print order, and with a limited buffer size, the first cycle of chunks includes the entirety of the Q sub-documents, or at least Q×L pages. In at least some embodiments, this may be a very large number of pages and may be larger than DQS. In at least some embodiments, the length and composition of the chunks is adjusted depending on the ratio of L versus DQS, R, and Q.

Let Q'=floor(DQS/L).
(Unless otherwise indicated, the mathematical functions floor, ceiling, and round can be substituted for each other in any of the equations presented herein.)

For instances with low L (i.e., Q'>=Q), pages from more sub-documents than Q can be included into each cycle of chunks without increasing the chunk size beyond DCS. This situation results in the following:
    If Q'>=Q, then C=floor(Q'×L/R)
Alternatively, the chunk size C for these instances can be set equal to DCS which equals DQS/R or to a corresponding integer obtained applying the floor, ceiling, or round function to DQS/R.

For instances with higher L (i.e., Q'<Q), the chunk size is increased so that at least Q sub-documents are covered in each cycle of chunks. This situation results in the following:
    if Q'<Q, then C=ceiling(L×Q/R)
    As an example, if DCS=56, R=5 and Q=3,
    If L=4, Q'=floor(56×5/4)=70,
    which is greater than Q, so C=floor(70×4/5)=56
    If L=32, Q'=floor(56×5/32)=8,
    which is greater than Q, so C=floor(8×32/5)=51
    If L=100, Q'=floor (56×5/100)=2.8,
    which is less than Q, so C=ceiling(100×3/R)=60
    If L=300, Q'=floor (56×5/300)=0.93,
    which is less than Q, so C=ceiling(300×3/R)=180

The number of pages in a cycle of chunks is not necessarily an integer multiple of the repeat length of the submitted variable data document. In at least some embodiments, each page index within a series of at least Q sub-documents is included in each chunk.

In the last two examples (L=100 and L=300), the chunk size to be used is larger than the DCS. In at least some embodiments, this can be mitigated by the order of pages within each chunk, to ensure delivery of the rasters in an order as close as possible to the sequence to be sent to the print engine. Thus, for the example in which L=300, C, the number of pages within each chunk, is 180, and the first cycle of chunks will include C×R, or 180×5=900 pages. Each page number in a chunk is 5 (from R—the number of RIPs) greater than the previous page number. This means that the first cycle of chunks would be:
    Chunk 1: 1, 6, 11, 16, 21, 26 . . . 891, 896
    Chunk 2: 2, 7, 12, 17, 22, 27 . . . 892, 897
    . . .
    Chunk 5: 5, 10, 15, 20, 25, 30 . . . 895, 900

The next cycle of chunks would start with page numbers 901, 902, 903, 904 and 905. In general, each chunk of the first cycle of chunks contains pages i, i+R, . . . , i+(C−1)R of the variable data document. For J cycles of chunks and for each cycle j except j=J, each chunk $C_{ij}$ of a jth cycle of chunks contains pages i+(j−1)CR, i+R+(j−1)CR, . . . , i+(C−1)R+(j−1)CR of the variable data document. The last cycle of chunks may be different because there are fewer than CR pages remaining, as discussed below.

The same method of sorting pages within each chunk can be used for variable data documents with short repeat lengths (e.g., low values of L). Alternatively, each chunk of the first cycle of chunks contains pages i, i+L, . . . , i+(C−1)L of the variable data document. For J cycles of chunks and for each cycle j except j=J, each chunk $C_{ij}$ of a jth cycle of chunks contains pages i+(j−1)CL, i+L+(j−1)CL, . . . , i+(C−1)L+(j−1)CL of the variable data document. The last cycle of chunks may be different because there are fewer than CL pages remaining, as discussed below.

The order of pages within each chunk appears identical to that in the "limited buffer" example above. The difference between the two is that the chunk size has been dynamically and substantially increased to facilitate identification of re-used graphics as well as the limited buffer consideration.

Even though the chunk sizes can be fairly large and the full set of page rasters from one cycle of chunks would not fit into the DQS, the pages generally can be delivered in approximately the correct order for onward processing on the press. Accordingly, pages can leave the buffer as fast as they are required by the press and the buffer is refilled by the RIPs at the same time. If the buffer is filled the RIPs can simply be delayed without too much risk that the next page required by the press is not yet available in the buffer. The methods and systems described herein can be used in combination with any method, algorithm, or device that can identify any case where a page may be delivered so much later than a desired time for receipt that there is a risk of failing to fit the page within the buffer.

One challenge with a large chunk size like this is that some pages in each sub-document may be more complex than others, and therefore take longer to process than others. This could be a challenge if both the difference in complexity between pages is very large (especially the difference in complexity of the variable graphics, which are still being rendered for every page after the re-used graphics have been cached) and the repeat length of the variable data document (L) is the same as the number of RIPs (R); but the calculations above will only result in such large chunks if L is much larger than R. When using smaller chunks, the load can be balanced more dynamically because each chunk is submitted to the first RIP to complete its previous chunk, meaning that a RIP that happened to process simpler variable data documents on one cycle will be first to pick up the next chunk.

In step 210, the chunks are processed using the RIPs to produce rasters. In step 212, the variable data document is printed using the rasters.

In at least some embodiments, RIPing a variable data document will include multiple cycles of chunks, but the total number of pages in a cycle of chunks will very commonly not divide exactly into the number of pages in the variable data document, so there will be a remainder of pages to be processed. In at least some embodiments, for example, for short repeat lengths, the chunk size C is reduced for the last few chunks to continue to balance the load across multiple RIPs as much as possible without reducing below Q sub-documents per cycle of chunks. In least some embodiments, for example, for longer repeat lengths where Q' already matches Q, it is more efficient to retain the same chunk size, even though that may mean that a subset of RIPs is idle while the last few chunks are processed by other RIPs. For a busy DFE, there is likely a next variable data document queued up that can take advantage of the idle RIPs.

All of the examples above assume that the order of pages to be sent to the print engine is a complete contiguous sequence in ascending order: 1, 2, 3, 4, etc. The methods and system described herein can be extended to address additional cases, such as: 1) delivery in descending order, 2) delivery of every odd or every even page (e.g., a RIP is processing only the front or only the back of each final printed piece), 3) delivery of only parts of the submitted variable data document because the variable data document is being split over multiple presses, 4) delivery of only color or only monochrome pages from the variable data document, or the like or any combination thereof.

This approach to setting both the size and composition of chunks of variable data documents when multiple RIPs are used to process them in parallel, and where the raster data is transmitted directly to the press marking engine facilitates: identification of re-used graphical elements in a way that allows further processing to be efficient; or delivery of rasters from the RIPs to the marking engines in as close to the order for that delivery, while also limiting the short-term storage in the buffer.

The methods and systems described herein may be embodied in many different forms and should not be construed as limited to the embodiments set forth herein. Accordingly, the methods and systems described herein may take the form of an entirely hardware embodiment, an entirely software embodiment or an embodiment combining software and hardware aspects. Systems referenced herein typically include memory and typically include methods for communication with other devices including mobile devices. Methods of communication can include both wired and wireless (e.g., RF, optical, or infrared) communications methods and such methods provide another type of computer readable media; namely communication media. Wired communication can include communication over a twisted pair, coaxial cable, fiber optics, wave guides, or the like, or any combination thereof. Wireless communication can include RF, infrared, acoustic, near field communication, Bluetooth™, or the like, or any combination thereof.

It will be understood that each block of the flowchart illustrations, and combinations of blocks in the flowchart illustrations and methods disclosed herein, can be implemented by computer program instructions. These program instructions may be provided to a processor to produce a machine, such that the instructions, which execute on the processor, create means for implementing the actions specified in the flowchart block or blocks disclosed herein. The computer program instructions may be executed by a processor to cause a series of operational steps to be performed by the processor to produce a computer implemented process. The computer program instructions may also cause at least some of the operational steps to be performed in parallel. Moreover, some of the steps may also be performed across more than one processor, such as might arise in a multi-processor computer system. In addition, one or more processes may also be performed concurrently with other processes, or even in a different sequence than illustrated without departing from the scope or spirit of the invention.

The computer program instructions can be stored on any suitable computer-readable medium including, but not limited to, RAM, ROM, EEPROM, flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by a computer.

The above specification provides a description of the manufacture and use of the invention. Since many embodiments of the invention can be made without departing from the spirit and scope of the invention, the invention also resides in the claims hereinafter appended.

What is claimed as now and desired to be protected by Letters Patent of the United States is:

1. A method for printing a variable data document, the method comprising:

receiving the variable data document, wherein the variable data document comprises a plurality of sub-documents, wherein each of the sub-documents comprises an identical portion that is identical for each sub-document and a variable data portion that differs from least one of the other sub-documents, wherein the variable data document has a specified or estimated repeat length L;

receiving or selecting a designated queue size (DQS) and a parameter Q representing a number of repeated pages to be provided in a chunk;

arranging at least a portion of the variable data document into at least one cycle of chunks for processing using a plurality of raster image processors (RIPs), wherein each of the at least one cycle of chunks contains R chunks $C_1, \ldots, C_R$, wherein R is an integer greater than one, wherein, for i=1, ..., R, each chunk $C_i$ of a first cycle of the at least one cycle of chunks has a size C defined as follows Q' is equal to one of a) floor(DQS/L), b) ceiling(DQS/L), c) round(DQS/L), or d) DQS/L, when Q'≥Q, then C is equal to one of a) floor(Q'×L/R), b) ceiling(Q'×L/R), c) round(Q'×L/R), d) floor(DQS/R), e) ceiling(DQS/R), or f) round(DQS/R) and each of the chunks $C_i$ includes either a) pages i, i+R, ..., i+(C−1)R of the portion of the variable data document or b) pages i, i+L, ..., i+(C−1)L of the portion of the variable data document, wherein selection of a) or b) is identical for all of the chunks $C_i$, and when Q'<Q then C is equal to one of a) ceiling(L×Q/R), b) floor(L×Q/R), or c) round(L×Q/R) and each of the chunks $C_i$ includes pages i, i+R, ..., i+(C−1)R of the portion of the variable data document; and processing, using the RIPs, the portion of the variable data document into rasters for printing by providing at least one chunk of the at least one cycle of chunks to each of the RIPs.

2. The method of claim 1, further comprising printing the variable data document using the rasters.

3. The method of claim 1, wherein R corresponds to the number of RIPs.

4. The method of claim 1, wherein the at least one cycle of chunks comprises a plurality of cycles of chunks.

5. The method of claim 4, wherein the plurality of cycles of chunks comprises J cycles of chunks, wherein J is an integer and is at least 3 and j=1, ..., J, wherein, for each cycle j except for j=J, each chunk $C_{ij}$ of a jth cycle of chunks has a size C defined as follows Q' is equal to one of a) floor(DQS/L), b) ceiling(DQS/L), or c) round(DQS/L), when Q'≥Q, then C is equal to one of a) floor(Q'×L/R), b) ceiling(Q'×L/R), c) round(Q'×L/R), or d) DQS/R and each of the chunks $C_{ij}$ includes either a) pages i+(j−1)CR, i+R+(j−1)CR, ..., i+(C−1)R+(j−1)CR of the portion of the variable data document or b) pages i+(j−1)CL, i+L+(j−1)CL, ..., i+(C−1)L+(j−1)CL of the portion of the variable data document, wherein selection of a) or b) is identical for all of the chunks $C_{ij}$, and when Q'<Q then C is equal to one of a) ceiling(L×Q/R), b) floor(L×Q/R), or c) round(L×Q/R) and each of the chunks $C_{ij}$ includes pages i+(j−1)CR, i+R+(j−1)CR, ..., i+(C−1)R+(j−1)CR of the portion of the variable data document.

6. The method of claim 1, wherein DQS is an estimate of a number of pages that can be buffered in short-term memory.

7. The method of claim 1, wherein Q is in a range from 3 to 60.

8. A system for printing a variable data document, the system comprising:

at least one processor configured and arranged to perform actions, the actions comprising:

receiving the variable data document, wherein the variable data document comprises a plurality of sub-documents, wherein each of the sub-documents comprises an identical portion that is identical for each sub-document and a variable data portion that differs from least one of the other sub-documents, wherein the variable data document has a specified or estimated repeat length L;

receiving or selecting a designated queue size (DQS) and a parameter Q representing a number of repeated pages to be provided in a chunk;

arranging at least a portion of the variable data document into at least one cycle of chunks for processing using a plurality of raster image processors (RIPs), wherein each of the at least one cycle of chunks contains R chunks $C_1, \ldots, C_R$, wherein R is an integer greater than one, wherein, for i=1, ..., R, each chunk $C_i$ of a first cycle of the at least one cycle of chunks has a size C defined as follows Q' is equal to one of a) floor(DQS/L), b) ceiling(DQS/L), c) round(DQS/L), or d) DQS/L, when Q'≥Q, then C is equal to one of a) floor(Q'×L/R), b) ceiling(Q'×L/R), c) round(Q'×L/R), d) floor(DQS/R), e) ceiling(DQS/R), or f) round(DQS/R) and each of the chunks $C_i$ includes either a) pages i, i+R, ..., i+(C−1)R of the portion of the variable data document or b) pages i, i+L, ..., i+(C−1)L of the portion of the variable data document, wherein selection of a) or b) is identical for all of the chunks $C_i$, and when Q'<Q then C is equal to one of a) ceiling(L×Q/R), b) floor(L×Q/R), or c) round(L×Q/R) and each of the chunks $C_i$ includes pages i, i+R, ..., i+(C−1)R of the portion of the variable data document; and processing, using the RIPs, the portion of the variable data document into rasters for printing by providing at least one chunk of the at least one cycle of chunks to each of the RIPs.

9. The system of claim 8, further comprising a printing device coupled to the at least one processor, wherein the actions further comprise printing, on the printing device, the variable data document using the rasters.

10. The system of claim 8, wherein R corresponds to the number of RIPs.

11. The system of claim 8, wherein the at least one cycle of chunks comprises a plurality of cycles of chunks.

12. The system of claim 11, wherein the plurality of cycles of chunks comprises J cycles of chunks, wherein J is an integer and is at least 3 and j=1, . . . , J, wherein, for each cycle j except for j=J, each chunk $C_{ij}$ of a jth cycle of chunks has a size C defined as follows Q' is equal to one of a) floor(DQS/L), b) ceiling(DQS/L), or c) round(DQS/L), when Q'≥Q, then C is equal to one of a) floor(Q'×L/R), b) ceiling(Q'×L/R), c) round(Q'×L/R), or d) DQS/R and each of the chunks $C_{ij}$ includes either a) pages i+(j−1)CR, i+R+(j−1)CR, . . . , i+(C−1)R+(j−1)CR of the portion of the variable data document or b) pages i+(j−1)CL, i+L+(j−1)CL, . . . , i+(C−1)L+(j−1)CL of the portion of the variable data document, wherein selection of a) or b) is identical for all of the chunks $C_{ij}$, and when Q'<Q then C is equal to one of a) ceiling(L×Q/R), b) floor(L×Q/R), or c) round(L×Q/R) and each of the chunks $C_{ij}$ includes pages i+(j−1)CR, i+R+(j−1)CR, . . . , i+(C−1)R+(j−1)CR of the portion of the variable data document.

13. The system of claim 8, wherein DQS is an estimate of a number of pages that can be buffered in short-term memory.

14. The system of claim 8, wherein Q is in a range from 3 to 60.

15. A non-transitory computer-readable medium having processor-executable instructions for printing a variable data document, the processor-executable instructions when installed onto a device enable the device to perform actions, the actions comprising:

receiving the variable data document, wherein the variable data document comprises a plurality of sub-documents, wherein each of the sub-documents comprises an identical portion that is identical for each sub-document and a variable data portion that differs from least one of the other sub-documents, wherein the variable data document has a specified or estimated repeat length L;

receiving or selecting a designated queue size (DQS) and a parameter Q representing a number of repeated pages to be provided in a chunk;

arranging at least a portion of the variable data document into at least one cycle of chunks for processing using a plurality of raster image processors (RIPs), wherein each of the at least one cycle of chunks contains R chunks $C_1, \ldots, C_R$, wherein R is an integer greater than one, wherein, for i=1, . . . , R, each chunk $C_i$ of a first cycle of the at least one cycle of chunks has a size C defined as follows Q' is equal to one of a) floor(DQS/L), b) ceiling(DQS/L), c) round(DQS/L), or d) DQS/L, when Q'≥Q, then C is equal to one of a) floor(Q'×L/R), b) ceiling(Q'×L/R), c) round(Q'×L/R), d) floor(DQS/R), e) ceiling(DQS/R), or f) round(DQS/R) and each of the chunks $C_i$ includes either a) pages i, i+R, . . . , i+(C−1)R of the portion of the variable data document or b) pages i, i+L, . . . , i+(C−1)L of the portion of the variable data document, wherein selection of a) or b) is identical for all of the chunks $C_i$, and when Q'<Q then C is equal to one of a) ceiling(L×Q/R), b) floor(L×Q/R), or c) round(L×Q/R) and each of the chunks $C_i$ includes pages i, i+R, . . . , i+(C−1)R of the portion of the variable data document; and processing, using the RIPs, the portion of the variable data document into rasters for printing by providing at least one chunk of the at least one cycle of chunks to each of the RIPs.

16. The non-transitory computer-readable medium of claim 15, wherein the actions further comprise printing the variable data document using the rasters.

17. The non-transitory computer-readable medium of claim 15, wherein the at least one cycle of chunks comprises a plurality of cycles of chunks.

18. The non-transitory computer-readable medium of claim 17, wherein the plurality of cycles of chunks comprises J cycles of chunks, wherein J is an integer and is at least 3 and j=1, . . . , J, wherein, for each cycle j except for j=J, each chunk $C_{ij}$ of a jth cycle of chunks has a size C defined as follows Q' is equal to one of a) floor(DQS/L), b) ceiling(DQS/L), or c) round(DQS/L), when Q'≥Q, then C is equal to one of a) floor(Q'×L/R), b) ceiling(Q'×L/R), c) round(Q'×L/R), or d) DQS/R and each of the chunks $C_{ij}$ includes either a) pages i+(j−1)CR, i+R+(j−1)CR, . . . , i+(C−1)R+(j−1)CR of the portion of the variable data document or b) pages i+(j−1)CL, i+L+(j−1)CL, . . . , i+(C−1)L+(j−1)CL of the portion of the variable data document, wherein selection of a) or b) is identical for all of the chunks $C_{ij}$, and when Q'<Q then C is equal to one of a) ceiling(L×Q/R), b) floor(L×Q/R), or c) round(L×Q/R) and each of the chunks $C_{ij}$ includes pages i+(j−1)CR, i+R+(j−1)CR, . . . , i+(C−1)R+(j−1)CR of the portion of the variable data document.

19. The non-transitory computer-readable medium of claim 15, wherein DQS is an estimate of a number of pages that can be buffered in short-term memory.

20. The non-transitory computer-readable medium of claim 15, wherein Q is in a range from 3 to 60.

\* \* \* \* \*